United States Patent Office 2,931,626
Patented Apr. 5, 1960

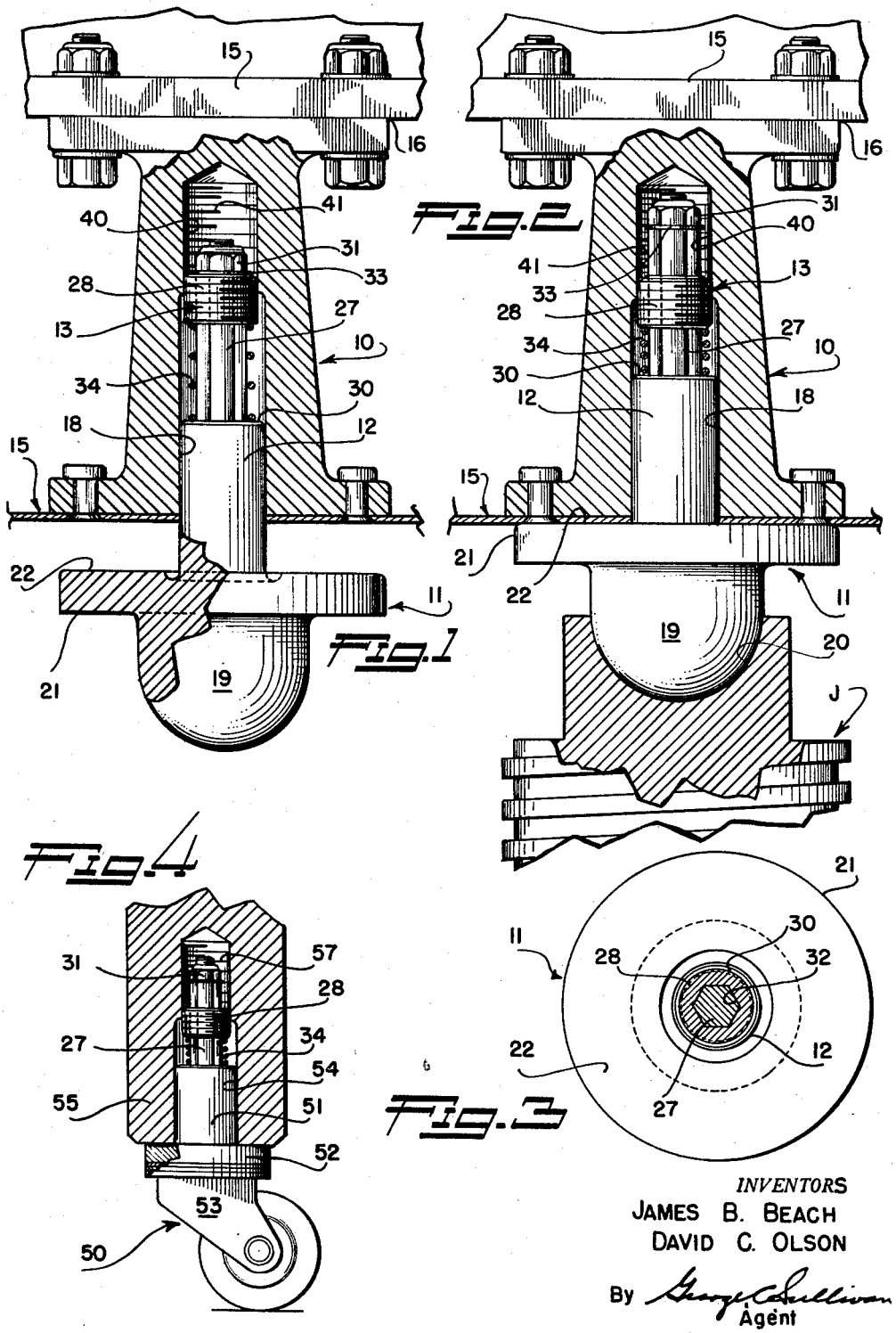

2,931,626

ADAPTER PADS AND FITTINGS

James B. Beach, Van Nuys, and David C. Olson, Burbank, Calif., assignors to Lockheed Aircraft Corporation, Burbank, Calif.

Application February 13, 1957, Serial No. 640,053

1 Claim. (Cl. 254—1)

This invention relates to fittings or adapters such as used on aircraft and other vehicles and devices to receive or transfer heavy forces and loads and it is a general object of the invention to provide such fittings that are easily and quickly installed, employed for their intended purpose and subsequently readily removed without danger of damaging either the fittings or the airplane or other structure on which they are employed.

In many situations it is the practice to install adapters, pads, or the like, to be engaged by jacks and other lifting and pushing mechanisms. For example, in modern day aircraft it is necessary to make provision for supporting or lifting the wings and other parts by jacks in a manner that is safe and non-damaging to the airplane. This has usually been done by using pads or adapters designed to be engaged by the jacks. These pads or adapters are usually removably secured to the airplane by pin and bayonet slot connections, spring loaded ball-socket arrangements, screw-threads, etc. and after use are removed or disengaged from the airplane structure. In practice, these devices are a source of considerable inconvenience and often are the cause of expensive time delays since the pins, balls, threads, or other attaching means become jammed, broken or inoperative for one reason or the other so as to interfere with the installation and/or removal of the pads or adapters, sometimes to the extent that they must be forcibly removed, thus endangering the airplane structure. Similar difficulties and problems arise in connection with the installation and removal of casters, "rolling ball" devices, leg pads, and the like, employed on furniture, aircraft ground handling equipment and in like situations.

It is another object of our invention to provide removable adapters, pads, and the like, that do not incorporate pins liable to be sheared off or bent, balls that are subject to jamming, or other parts that may become locked or broken off in the structure. The devices of this invention are devoid of pins, latches, locks, balls, and the like, subject to failure, bending, and binding, and, therefore, may be easily installed and quickly removed.

Another object of the invention is to provide adapters and the like of this kind that employ screw threads, or the equivalent, for positioning and retaining the pad or adapter on the airplane or other structure and a unique arrangement which relieves the threads of the jack forces, airplane weight and other loads and permits these forces to be transmitted directly through the structure, thus "by-passing" the screw threads. This arrangement prevents shearing and distortion of the threads so that the threads are relieved of practically all wear to remain in good condition indefinitely. This arrangement thus makes it unnecessary to apply any appreciable force in removing the pads and, therefore, eliminates the possibility of injuring the airplane structure.

It is a further object of the invention to provide pads or adapters of this kind that are inexpensive to manufacture and do not require the provision of elaborate or expensive parts or fixtures on the airplane or other device on which they are to be used.

Other objectives and features of the invention will become apparent from the following detailed description of typical preferred embodiments illustrated in the accompanying drawings in which:

Figure 1 is a vertical detailed sectional view of a pad or fitting means of the invention with the parts in the positions they may assume prior to actual use;

Figure 2 is a view similar to Figure 1 showing the pad in engagement with a jack, or the like;

Figure 3 is a transverse sectional view through the sleeve and shank of the pad with the upper side of the pad proper appearing in elevation; and Figure 4 is a reduced side elevation of another form and application of the invention.

The pads and fittings of the invention are capable of being employed in various situations and for numerous purposes. We will proceed with a detailed description of the two forms of the invention illustrated in the drawings, it being understood that the illustrated and described embodiments are not intended to place limitations on the scope or application of the invention.

The embodiment shown in Figures 1, 2 and 3 is suitable for use on airplanes, aircraft ground handling equipment and in other situations and with other devices that may require engagement by supporting or lifting jacks and the like. The form of the invention shown in these figures includes what we will term a receptacle or socket 10 for incorporation in or attachment to the airplane or other structure, a pad 11 for engagement with or by a jack J and having a shank 12 for entering the socket 10 and means 13 for releasably associating the pad with the socket for engagement with the jack J.

The receptacle or socket 10 is attached to, embodied in, or may form a part of the airplane structure or other device. Thus, while we have shown a receptacle or socket 10 as a separate part and a specially constructed part, it may, in many situations, be an element or portion of an element of the airplane or other structure or device. The socket 10 is secured or fixed to the structure 15 of the airplane at 16 and has a central generally vertical opening 18 whose lower end is accessible at the underside of the structure.

The pad 11 is constructed and shaped for cooperation with the jack J or other similar device. In the case illustrated the pad 11 has a partially spherical head 19 adapted to be received in a correspondingly shaped recess 20 in the upper end of the jack J. The cooperation of the head 19 and the socket holds the pad 11 and the jack in proper relation. The adapter body or pad 11 has a flange 21 at the upper end of the head 19 presenting a broad or extensive upper surface 22 for cooperating with the under surface of the structure 15. The periphery of the flange 21 may be round or circular, as shown, although if desired it may be of other configurations; for example, it may be polygonal. The flange 21 is manually engaged to install and remove the pad 11. The above mentioned shank 12 of the pad 11 rises from the upper side of the flange 21. As illustrated, the shank 12 may be a simple cylindrically shaped part and is adapted to slide or move in the opening 18 of the socket 10. In the construction illustrated the shank 12 and the head 19 are coaxial and the flange 21 lies in a plane normal to the shank. This adapts the pad for use with a structure such as shown in the drawings where the under surface of the structure 15 is horizontal and the socket opening 18 is normal to this surface. In this connection the means 13, described below, is such that the upper surface 22 of the flange 21 may be canted or pitched relative to the longitudinal axis of the shank 12 to conform to and flatly engage with the under surface of the structure 15 in situations where the latter is canted or inclined. This is an important advantage in airplane jack pads where the accessible under surface of the structure is oftentimes inclined.

The means 13 for releasably associating the pad 11 with the structure 15, or the like, is such that the pad may be easily and quickly engaged in the socket 10 for use, that is for engagement by the jack J, and after use quickly released without the necessity in either case of employing tools or any substantial force. It is a feature that the means 13 does not embody parts or elements liable to be damaged by the heavy jacking loads or the weight of the airplane or any parts that may be bent, sheared, or jammed, as a result of use of the pad and as a consequence the means 13 always remains in condition for immediate easy use. The means 13 includes an extension or stem 27 continuing upwardly from the upper end of the shank 12 and a sleeve 28 slidable but non-rotatable on the stem. The stem 27 is of reduced thickness or diameter so that an upwardly facing shoulder 30 is present where the stem joins the shank 12, and a nut 31 is screw-threaded on the upper end of the stem. The engagement of the sleeve 28 on the stem 27 is such as to allow free relative longitudinal movement between the sleeve and stem while preventing relative rotation or angular movement between the sleeve and stem. In the form of the invention illustrated in the drawings the stem 27 is polygonal in transverse cross section and the opening 32 in the sleeve 28 is correspondingly shaped so that the parts are related for relative longitudinal movement and are keyed or held against relative rotation. The nut 31, which may have a washer 33 at its lower side prevents displacement of the sleeve 28 from the stem 27. A helical spring 34 is arranged under compression between the lower end of the sleeve 28 and the shoulder 30 for the purpose to be later described. It will be seen in Figure 1 that the sleeve 28 is considerably shorter than the stem 27 and the spring 34 normally holds the sleeve on the upper portion of the stem where it engages against the washer 33.

The means 13 is such that the sleeve 28 may be readily engaged and held in the socket 10 to position the fitting or pad for engagement by the jack J so that such engagement and subsequent operation of the jack will bring the surface 22 of the pad flange 21 into engagement with the structure 15 without transferring any substantial load to the sleeve or its attachment or engagement with the socket 10 and then after use of the jack J the sleeve may be easily and quickly detached or disengaged from the socket to permit removal of the pad. To this end the opening 18 of the socket 10 has a reduced counterbore or extension 40 and the sleeve 28 and this counterbore have matable or cooperable engaging parts. These may take the form of broken threads, pin and bayonet slot elements, or screw-threads 41 on the sleeve and wall of the counterbore, as illustrated.

It will be observed that the spring 34 urges the sleeve 28 to a normal position where it engages upwardly against the washer 33 so that when the shank 12 and stem 27 are introduced into the opening 18 the sleeve 28 is positioned to enter the counterbore 40. Since the sleeve 28 is obliged to turn with the stem 27, simple manual rotation of the pad 11 will thread the sleeve 28 into the counterbore 40. While it is possible to thread the sleeve 28 upwardly a substantial distance in the counterbore 40 to bring the flange surface 22 adjacent to or in engagement with the structure 15, this is not necessary in most situations and applications of the invention. Thus, assuming that the sleeve 28 has been threaded only a short distance into the counterbore 40, as shown in Figure 1, the pad is conditioned or held on the structure in a manner that it may be engaged by the jack J. Subsequent engagement by the jack J with the pad head 19 and subsequent actuation of the jack J, or lowering of the structure, will bring the pad 11 and the structure 15 together, bringing the surface 22 against the underside of the structure, the polygonal stem 27 merely sliding upwardly through the sleeve 28 during this operation without transferring any appreciable loads to the screw threads 41. This avoids shearing of the threads 41 or other damage to the threads so that the threads will remain undamaged and operative indefinitely. After use and when it is desired to remove the fitting or pad, the flange 21 or the head 19, or both, are simply grasped and turned to unscrew the sleeve 28 from the counterbore 40. In this connection it will be noted that gravity, aided by the spring 34, will move the pad to a position such as shown in Figure 1 where it is conveniently accessible for grasping.

The invention is capable of being associated with casters, rolling balls, and other floor and ground engaging devices. Figure 4 shows an adapter of the invention associated with a caster 50 which, so far as the present invention is concerned, may be of conventional construction. The adapter in this case includes a shank 51 having a flange 52 on its lower end, the shank and flange corresponding with the above described shank 12 and flange 21. The caster 50 is secured on the underside of the flange 52 and, as shown, has the usual wheel receiving fork 53 carried by suitable anti-friction bearings to allow "castering" of the caster. The shank 51 is received in a socket or opening 54 in the structure 55 and the upper end of the flange 52 is adapted to bear on or engage the lower surface of the structure. The opening 54 has a threaded continuation or counterbore of reduced diameter and the adapter has the polygonal stem 27, threaded sleeve 28, nut 31, and spring 34, all as above described. While the bearings of the caster 50 should allow free castering of the fork 53 relative to the adapter, it may be found desirable to roughen, serrate, or tooth either the upper surface of the adapter flange 52 or the lower end of the structure 55, or both, to positively prevent rotation or angular movement of the adapter during use of the caster-adapter combination.

The use and features of the structure shown in Figure 4 of the drawings are substantially the same as those of the adapter or pad of Figures 1, 2 and 3. The caster-adapter assembly is readily installed by merely entering the stem 27 and shank 51 in the opening 54 and rotating the entire unit so as to thread or at least start the sleeve 28 in the screw-threaded opening 57. With the sleeve threaded at least some distance into the opening or counterbore 57 the structure 55 may be arranged in a position where the caster 50 assumes its weight or a portion of its weight whereupon the lower end of the structure and the flange 52 move into engagement for the direct transmission of the weight and loads, the stem 27 merely moving longitudinally through the sleeve 28 without imposing any appreciable loads on the sleeve or the screw threads. After use the caster and its adapter are easily removed by merely rotating the flange 52 to unscrew the sleeve 28 from the counterbore 57 whereupon the adapter may be withdrawn from the opening 54.

Having described only typical forms of the invention we do not wish to be limited to the specific details herein set forth, but wish to reserve to ourselves any variations or modifications that may appear to those skilled in the art and fall within the scope of the following claim.

We claim:

A load bearing adapter for use on movable structures having an adapter receiver recess therein comprising an adapter body having a cylindrical shank to be received in said recess of a diameter slightly smaller than the minimum recess diameter, a cylindrical flange on said shank integral therewith to be moved against the structure for transmission of loads under load conditions, said flange being of a diameter substantially greater than the recess, a load receiving member on said flange and integral therewith and coaxial with said shank and less than the diameter of said flange and greater than the diameter of said recess, a stem on said shank having a polygonal cross section and a maximum width less than the diameter of said shank, said stem and said shank being in combined height less than the depth of said recess and being of substantially equal length, a sleeve mounted on said stem and considerably shorter than said stem having threads on the exterior thereof for engaging matching threads in the upper portion of the side wall of the recess, the inside configuration of said sleeve corresponding in cross section from top to bottom with said stem, said stem being slidable within said sleeve, said sleeve having a diameter less than the diameter of said shank for engaging a restricted portion in the upper portion of the recess, a sleeve retainer on the end of said stem removably secured thereto and of a diameter less than that of the restricted portion of said recess and greater than the maximum width of said stem, said stem having that portion between said retainer and said sleeve unobstructed, said stem and said shank forming at their juncture a shoulder, a spring member positioned between said sleeve and said shoulder to normally bias said sleeve retainer against said sleeve, whereby when said load bearing adapter is inserted into said recess and said sleeve is threaded into said restricted portion, said flange is maintained away from said structure in non-load position and abuts said structure in load-bearing position.

References Cited in the file of this patent

UNITED STATES PATENTS

| | | |
|---|---|---|
| 1,114,417 | Turton | Oct. 20, 1914 |
| 1,271,559 | Feebusch et al. | July 9, 1918 |
| 1,383,337 | Post | July 5, 1921 |
| 1,927,271 | Noelting et al. | Sept. 19, 1933 |
| 2,541,720 | Robinson | Feb. 13, 1951 |

FOREIGN PATENTS

| | | |
|---|---|---|
| 162,109 | Great Britain | Apr. 28, 1921 |
| 564,783 | France | Oct. 30, 1923 |